United States Patent
Arage

(10) Patent No.: US 9,784,820 B2
(45) Date of Patent: Oct. 10, 2017

(54) RADAR SYSTEM WITH PHASE BASED MULTI-TARGET DETECTION

(71) Applicant: DELPHI TECHNOLOGIES, INC., Troy, MI (US)

(72) Inventor: Alebel Hassen Arage, Kokomo, IN (US)

(73) Assignee: DELPHI TECHNOLOGIES, INC., Troy, MI (US)

(*) Notice: Subject to any disclaimer, the term of this patent is extended or adjusted under 35 U.S.C. 154(b) by 476 days.

(21) Appl. No.: 14/491,192

(22) Filed: Sep. 19, 2014

(65) Prior Publication Data

US 2016/0084941 A1   Mar. 24, 2016

(51) Int. Cl.
| | |
|---|---|
| G01S 13/93 | (2006.01) |
| G01S 7/41 | (2006.01) |
| G01S 7/35 | (2006.01) |
| G01S 13/42 | (2006.01) |
| G01S 13/58 | (2006.01) |
| G01S 7/292 | (2006.01) |
| G01S 13/44 | (2006.01) |
| G01S 13/72 | (2006.01) |
| G01S 13/02 | (2006.01) |

(52) U.S. Cl.
CPC ............. *G01S 7/41* (2013.01); *G01S 7/2921* (2013.01); *G01S 7/354* (2013.01); *G01S 7/412* (2013.01); *G01S 7/414* (2013.01); *G01S 13/42* (2013.01); *G01S 13/4454* (2013.01); *G01S 13/584* (2013.01); *G01S 13/931* (2013.01); *G01S 13/726* (2013.01); *G01S 2013/0245* (2013.01)

(58) Field of Classification Search
CPC .......... G01S 13/931; G01S 7/41; G01S 7/414; G01S 7/415; G01S 7/354; G01S 13/44; G01S 13/4454; G01S 13/726
USPC ....................................... 342/70–72
See application file for complete search history.

(56) References Cited

U.S. PATENT DOCUMENTS

| | | | | |
|---|---|---|---|---|
| 3,952,303 A | * | 4/1976 | Watanabe | G01S 13/24 342/112 |
| 3,978,481 A | * | 8/1976 | Angwin | G01S 13/60 342/112 |
| 4,630,051 A | * | 12/1986 | Adams | G01S 13/89 342/133 |
| 5,093,649 A | * | 3/1992 | Johnson | G01S 7/2813 342/147 |
| 5,302,956 A | * | 4/1994 | Asbury | G01S 7/023 342/196 |

(Continued)

FOREIGN PATENT DOCUMENTS

| | | |
|---|---|---|
| EP | 1 580 572 A1 | 9/2005 |
| GB | 2 175 767 A | 12/1986 |

*Primary Examiner* — Peter Bythrow
(74) *Attorney, Agent, or Firm* — Lawrence D. Hazelton

(57) ABSTRACT

A radar system includes a plurality of antennas and a controller. The plurality of antennas is configured to detect a reflected radar signal reflected by an object in a field-of-view of the system. Each antenna of the plurality of antennas is configured to output a detected signal indicative of the reflected radar signal detected by the antenna. The controller is configured to receive detected signals from the plurality of antennas, and determine if a target is present in the field-of-view based on the detected signals. The controller is also configured to determine if the target includes more than one object based on an analysis of phases of the detected signals.

13 Claims, 6 Drawing Sheets

(56) References Cited

U.S. PATENT DOCUMENTS

| | | | | |
|---|---|---|---|---|
| 6,337,656 B1* | 1/2002 | Natsume | G01S 13/44 | 342/149 |
| 6,538,599 B1* | 3/2003 | David | G01S 7/2926 | 342/104 |
| 6,703,967 B1* | 3/2004 | Kuroda | G01S 13/348 | 342/111 |
| 6,924,762 B2* | 8/2005 | Miyake | G01S 13/34 | 342/109 |
| 7,190,305 B2* | 3/2007 | Isaji | G01S 7/354 | 342/107 |
| 7,301,496 B2* | 11/2007 | Honda | G01S 13/584 | 342/107 |
| 7,667,637 B2* | 2/2010 | Pedersen | G01S 7/35 | 342/104 |
| 7,791,528 B2* | 9/2010 | Klotzbuecher | G01S 13/584 | 342/109 |
| 8,054,216 B2* | 11/2011 | Kinoshita | G01S 13/4454 | 342/118 |
| 8,085,184 B2* | 12/2011 | Takabayashi | G01S 13/343 | 342/104 |
| 8,446,312 B2* | 5/2013 | Kanamoto | G01S 3/74 | 342/147 |
| 8,558,733 B2* | 10/2013 | Kamo | G01S 7/295 | 342/27 |
| 8,779,969 B2* | 7/2014 | Shimizu | G01S 7/412 | 342/106 |
| 8,816,902 B2* | 8/2014 | Itoh | G01S 3/74 | 342/104 |
| 8,847,815 B2* | 9/2014 | Kanamoto | G01S 3/74 | 342/118 |
| 8,866,668 B2* | 10/2014 | Kitagawa | G01S 7/354 | 342/104 |
| 8,907,840 B2* | 12/2014 | Kanamoto | G01S 3/74 | 342/107 |
| 8,976,058 B2* | 3/2015 | Mizutani | G01S 7/4026 | 342/70 |
| 8,994,582 B2* | 3/2015 | Itoh | G01S 7/4026 | 342/107 |
| 9,097,796 B2* | 8/2015 | Mizutani | G01S 3/465 | |
| 9,383,440 B2* | 7/2016 | Nakanishi | G01S 13/42 | |
| 9,400,325 B2* | 7/2016 | Millar | G01S 7/352 | |
| 2005/0156780 A1* | 7/2005 | Bonthron | G01S 3/48 | 342/107 |
| 2008/0165049 A1* | 7/2008 | Wakayama | G01S 3/46 | 342/91 |
| 2010/0075618 A1* | 3/2010 | Isaji | G01S 13/345 | 455/90.1 |
| 2013/0127655 A1* | 5/2013 | Kishigami | G01S 7/288 | 342/152 |
| 2014/0247180 A1 | 9/2014 | Moriuchi et al. | | |

* cited by examiner

RADAR SYSTEM WITH PHASE BASED MULTI-TARGET DETECTION

TECHNICAL FIELD OF INVENTION

This disclosure generally relates to a radar system, and more particularly relates to a system that determines if a target includes more than one object based on a comparison of phases of detected signals from multiple receive antennas.

BACKGROUND OF INVENTION

Because of antenna size, system size, technology, and cost constraints, automotive radar sensors may have performance limitations with regard to discriminating two objects that have similar position and Doppler shift characteristics, or if one object has a substantially larger Radar Cross Section (RCS) than a second nearby object. Examples of two objects with similar range and Doppler shift reflection characteristics that typical automotive radar systems have difficulty discerning include: a slowly moving pedestrian walking around stationary or slowly moving passenger vehicle, a motor cycle traveling beside a tractor-trailer traveling in an adjacent lane at a similar range and range rate, and two passenger cars moving close to each other on adjacent lanes with similar range rates.

SUMMARY OF THE INVENTION

Automotive systems such as Autonomous Intelligent Cruise Control, Collision Warning and Mitigation, and Blind Spot Detection use a radar sensor to detect objects proximate to the vehicle. Reflected radar signals are detected by an antenna array are typically converted to a discreet base band, then transformed from the time-domain to the frequency-domain where amplitude profiles indicative of each signal detected by each receive antenna element are integrated non-coherently. Automotive radars often use this non-coherently integrated (NCI) amplitude profile for object detection to determine position (i.e. range) and Doppler parameters (i.e. range-rate) of detected objects with profile magnitudes greater than a defined detection threshold. The NCI-detection technique is preferred as it suppresses noise variation to avoid false alarms. While NCI may degrade information in the detected signals, it does so less than the noise variance as system noise is less correlated across the antenna elements when compared to the reflected radar signal. As such, NCI provides a net gain in signal-to-noise ratio.

However, NCI-detection techniques have performance limitations for detection and discrimination of multiple objects that are near each other. That is, if two objects have similar position and Doppler characteristics, and the reflection characteristics or Radar Cross Sections (RCS) to the objects are significantly different, then the reflected radar signal from the object with the larger RCS may mask the reflected radar signal from target with smaller RCS, and thereby makes second target identification and/or discrimination difficult. Examples of this situation include a slowly moving pedestrian near a stationary passenger vehicle, a motor cycle moving with nearly the same range and Doppler as a tractor-trailer type vehicle in an adjacent lane, and two passenger vehicles moving close to each other on adjacent lanes with nearly the same range and Doppler.

Such a performance limitation could be improved by revised waveform parameter specification, and/or narrow beam antenna design. However, these options undesirably increase sensor size, cost, and signal processing complexity. Furthermore, it has been observed that some of the spectral parameters such as "spectrum beam width" are not a suitable for post-processing technique to extract reliable information for multiple objects from the energy content under the broaden spectrum. U.S. patent application Ser. No. 14/277,894 filed 15 May 2014 and entitled RADAR SYSTEM WITH IMPROVED MULTI-TARGET DESCRIMINATION by Alebel Arage Hassen, describes a detection system and method to improve the detection and discrimination of multiple near targets that uses a composite detection technique from a NCI-detection technique and an "or-logic" based single receive channel peaks detection technique. However, there is still a performance limitation to address and a desire for a less computational intensive way to determine if a detected target includes or comprises more than one object.

The performance limitations of near targets detection and discrimination of the detection technique using amplitude spectrum peak detection and evaluation technique is solved by local phase spectrum evaluation technique. When multiple, near each other scattering centers of an object or objects are present, reflected radar signals from each scattering center interfere with each other differently at the various receive antenna elements depending on the relative position difference of the various scattering centers with respect to the receive antenna position. Relative position difference between scattering centers is expressed in terms of relative phase difference between the reflected radar signals from the various scattering centers, and it determines interference characteristics at the receive antenna. That means that various antenna-array elements receive dissimilar interference characteristics of reflected radar signals from these scattering centers due to the fact that relative phase difference changes across distributed antenna elements.

As it is a matter of interference between reflected radar signals from distinct scattering centers located in a close relative proximity to each other, a phase difference of detected signals from each receive antenna element can be evaluated in the frequency domain local to the superposed signal frequency bin. For example, a phase difference may be calculated between the first symmetrical (i.e. first higher and lower) frequency bins to the superposed signal detection frequency bin. The phase difference converges to a minimum value (or zero) if detected signals are from a single point scattering center. This is because signal amplitude and phase spectrums are generally spread equally to neighboring frequency bins as far as the time domain signal is weighted by symmetrical window coefficients about the window maximum at the center. In case of reflected radar signal interference from multiple nearby scattering centers, these first symmetrical frequency bins should contain different signal phase values as far as scattering centers possess a relative position difference.

For antenna-array configurations, averaging of the phase difference across the antenna-array elements provides a robust phase difference value that can be used to distinguish a single point scattering center from multiple near scattering centers. As discussed, there is also phase difference variation across antenna-array elements due to the fact that the relative position difference of scattering centers are not equal for distributed antenna-array configuration. Therefore, evaluating the slope or standard deviation of the phase difference across antenna-array elements can also be employed to distinguish single scattering center from multiple near scattering centers.

Note that a local phase spectrum evaluation technique by itself does not provide parameter estimation of the scattering centers as it was the case for the detection and discrimination techniques described by Hassen (application. Ser. No. 14/277,894). However, it is more sensitive to distinguish a reflection of a single scattering center from multiple near to each other scattering centers. It can be then used as indicator to activate controlled parameter estimation techniques such as the amplitude spectrum peak detection and evaluation technique using an "or-logic" single channel detection technique as described by Alebel Arage Hassen (application. Ser. No. 14/277,894), or a complex spectrum evaluation technique using space-time adaptive processing. Alternatively, this local phase spectrum evaluation technique can also be used to let the system define Range-Doppler Near-Objects Detection zone (RDNOD-zone) about the NCI-detection if activation of parameter estimation technique is not realistic. This will assist optimal usage of limited signal processing resources while enhancing identification of multiple near scattering centers.

It is recognized that since this is a phase difference evaluation technique as opposed to an absolute phase evaluation, it is less susceptible to mismatch between antenna-array elements as well as any transients effects. However, it is recommended to apply this technique for detections only with adequate signal-to-noise ratio. Phase in general is susceptible to noise, and results from phase difference evaluation may not be reliable for detections with inadequate signal-to-noise ratio.

The incapability of detected object classification by automotive radar sensor that uses amplitude spectrum peak detection and evaluation technique is improved by a local phase spectrum evaluation technique. It was observed that the standard deviation of the phase difference fluctuates over time if the scattering centers are in continuous motion and trigger relative position variance with time. As such, it is recognized that the time domain variance (fluctuation) of the standard deviation of the phase difference provides further information that can be employed to distinctly classify or categorize various object groups and their motion profiles, for example, to distinguish pedestrians, bicyclists, and vehicles moving at an angle relative to the host vehicle from vehicles traveling straight forward or longitudinally relative to the host vehicle.

In accordance with one embodiment, a radar system is provided. The system includes a plurality of antennas and a controller. The plurality of antennas is configured to detect a reflected radar signal reflected by an object in a field-of-view of the system. Each antenna of the plurality of antennas is configured to output a detected signal indicative of the reflected radar signal detected by the antenna. The controller is configured to receive detected signals from the plurality of antennas, and determine if a target is present in the field-of-view based on the detected signals. The controller is also configured to determine if the target includes more than one object based on an analysis of phases of the detected signals.

In another embodiment, a controller for a radar system is provided. The controller includes a receiver and a processor. The receiver is configured to receive detected signals from a plurality of antennas configured to detect a reflected radar signal reflected by an object in a field-of-view of the system. Each antenna of the plurality of antennas is configured to output a detected signal indicative of the reflected radar signal detected by each of the antenna. The processor is configured to receive the detected signals from the plurality of antennas, determine if a target is present in the field-of-view based on the detected signals, and determine if the target includes more than one object based on an analysis of phases of the detected signals.

In another embodiment, a method of operating a radar system is provided. The method includes the step of receiving detected signals from a plurality of antennas configured to detect a reflected radar signal reflected by an object in a field-of-view of the antennas. Each antenna of the plurality of antennas is configured to output a detected signal indicative of the reflected radar signal detected by each of the antenna. The method also includes the step of determining if a target is present in the field-of-view based on the detected signals. The method also includes the step of determining if the target includes more than one object based on an analysis of phases of the detected signals.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
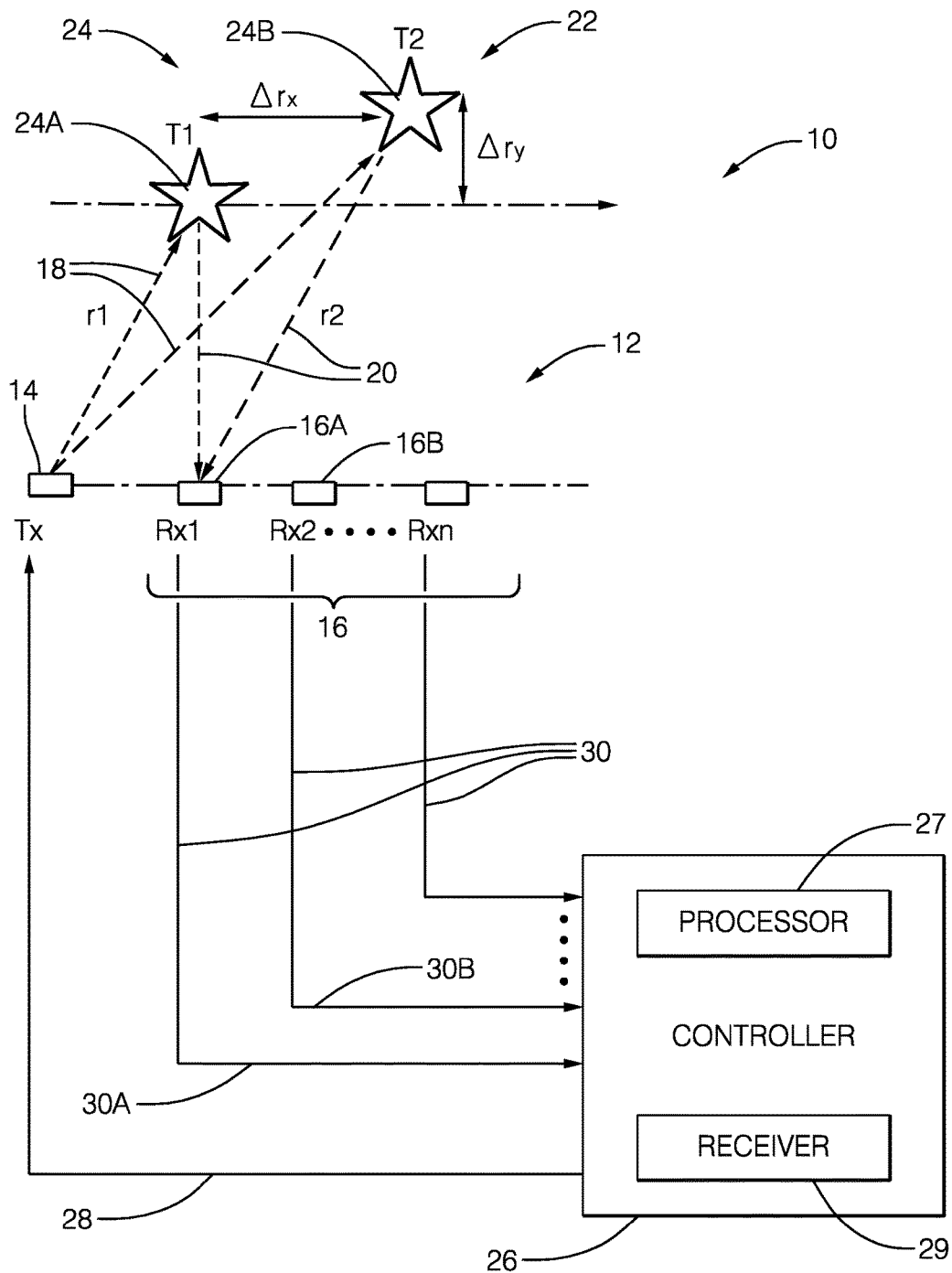
FIG. 1 is a diagram of a radar system in accordance with one embodiment.

FIG. 1 illustrates a non-limiting example of a radar system, hereafter referred to as the system 10. The system 10 includes an antenna array 12 that may include a transmit-element 14, and an array of receive elements, hereafter referred to as a plurality of antennas 16. It is recognized that one or more of the antenna elements that make up the antenna array 12 could be used to both transmit a radar signal 18, and output a detected signal 30 indicative of reflected radar signals 20 reflected by a first object 24A or a second object 24B in a field-of-view 22 of the system 10. The transmit-element 14 and the plurality of antennas 16 are illustrated as distinct elements in this example only to simplify the explanation of the system 10.

The system 10 may also include a controller 26 configured to output a transmit-signal 28 to the transmit-element 14, and configured to receive detected signals 30 from each antenna, for example a first signal 30A from a first antenna 16A and a second signal 30B from a second antenna 16B. Each of the detected signals 30 correspond to the reflected radar signal 20 that was detected by one of the plurality of antennas 16. The controller 26 may include a processor 27 such as a microprocessor, digital signal processor, or other control/signal conditioning circuitry such as analog and/or digital control circuitry including an application specific integrated circuit (ASIC) for processing data, as should be evident to those in the art. The controller 26 may include memory (not shown), including non-volatile memory, such as electrically erasable programmable read-only memory (EEPROM) for storing one or more routines, thresholds and captured data. The one or more routines may be executed by the processor 27 to perform steps for determining if the detected signals 30 received by the controller 26 indicate the presence of the first object 24A or the second object 24B, as described herein.

To meet customer specified angular-resolution requirements of automotive radar systems, such systems often use antennas that have relatively narrow transmit and receive beam-widths to scan a field-of-view for objects. In this non-limiting example, the transmit-element 14 radiates or emits the radar signal 18 toward the first object 24A and/or the second object 24B in a field-of-view 22, and the plurality of antennas 16 each detect a reflected radar signal reflected by the first object 24A and/or the second object 24B in the field-of-view 22 of the system 10. Characteristics of the reflected radar signal 20 depend on a backscatter property or radar cross section (RCS) of the first object 24A or the second object 24B. The characteristics also depend on distance, direction, and relative motion of the first object 24A and/or the second object 24B relative to the antenna array 12, which influences the Doppler shift of the reflected radar signal 20. Depending on the signal waveform and the modulation system used, the controller 26 may transform the time domain signals (the detected signals 30) to the frequency domain so, for example, the spectrums can be combined using, for example, non-coherent integration (NCI). Some automotive radar systems use this non-coherently integrated spectral data as the basis for object detection, and evaluate the spectral data to determine the position and Doppler parameter estimates that have higher spectral magnitude than a defined detection threshold. NCI is generally preferred to suppress noise induced variation and thereby keep noise induced false alarm rates to a minimum.

If multiple objects are present in the field-of-view 22, the reflected radar signal 20 may interfere with each other depending on the relative position and/or range rate difference between the objects with respect to the receive antennas (the plurality of antennas 16). A relative position difference between the first object 24A and the second object 24B is illustrated as Arx and Ary and may be exhibited in terms of a relative phase difference between the reflected radar signal 20 detected by the antennas 16 from these scattering centers. That may cause the detected signals 30 to exhibit dissimilar interference characteristics for the signals from the scattering centers of the objects due to the fact that the relative phase difference changes across the plurality of antennas 16. This leads to different range profiles and Doppler profiles across the plurality of antennas 16, and increases the probability to get instantaneous multiple spectral peaks and nulls if the detection strategy is based on an 'or-logic' comparison of the single-channel or individual signals. Depending on the number of elements in the plurality of antennas 16, this detection concept improves detection and discrimination of nearby scattering centers. By contrast, NCI based detection suppresses the position difference effect of scattering centers by averaging out the spectrum difference across the detected signals 30, which makes nearby scattering center resolution and discrimination more difficult.

Applicant's prior system described in U.S. patent application Ser. No. 14/277,894 filed 15 May 2014 applies a composite detection strategy based on NCI spectrum together with a single receive channel spectrum analysis using 'or logic' in order to improve automotive radar range, range rate, and angle measurement resolution, and enhance system performance for near targets discrimination, target imaging, and lateral range rate estimation. A time delay between transmitted and received signals as well as the frequency shift due to Doppler effect is used to compute radial distance (e.g. r1 or r2 in FIG. 1) and relative velocity of a detected object, e.g. the first object 24A or the second object 24B, respectively. The received signal-phase differences of the detected signals 30 are used to estimate the angle (direction) of a detected object by applying various angle finding techniques or algorithms such as Monopulse, digital beam forming, or super-resolution.

Object detection by the prior system may be first done in the Range-Doppler (RD) domain after applying a 2D-FFT algorithm to the detected signals 30, and then integrating the resulting range-Doppler spectrums non-coherently. Local maxima of the resultant NCI RD-image and their immediate adjacent neighboring spectrums are used and processed to detect object and determine its corresponding RD-coordinates including lateral and longitudinal position of the object after applying the desired angle finding algorithm on the detection raw spectral data.

In certain situations, multiple objects could have nearly the same range and Doppler parameters. The range and Doppler differences between these objects can be smaller than RD-measurement resolution, which is mainly predetermined from signal waveform parameters like sweeping frequency and dwell time. As result, these objects can appear as one local maxima of the NCI RD-image, and their discrimination will only depend on angle if they possess lateral span that is consistent with measurement resolution of the applied angle finding technique (i.e. antenna pattern beam width, configuration, and angle evaluation algorithm). That means, for relatively nearby targets with inadequate Doppler, longitudinal, and lateral separations, the performance of multiple targets discrimination is limited for NCI only RD-image based detection strategy.

For a specific radar system design, such a limitation in resolution and discrimination performance can be improved significantly if the detections strategy evaluates not only a composite NCI RD-image, but also each of the antenna signals on an individual basis, i.e. single receive channel RD-images. As described above, signals from two nearby scattering centers of an object or objects may interfere at the receive antenna element depending on signals relative phase difference between these scattering centers. This relative phase difference is a function of the lateral and longitudinal range separation (e.g. Arx, Ary) between these two scattering centers, and may not be equal across the plurality of antennas 16. This is especially true for automotive radar that operates at millimeter wave, 3.92 mm for example, which is much smaller than in the real world expected position difference between scattering centers. As a result, spectrums of the signals interference from these scattering centers should possess dissimilar profile between receive antenna-array elements, and show peaks and nulls at different range and Doppler frequencies for different antenna-array elements. An improved way to determine if the target 24 includes or is made up of more than one object, e.g. the first object 24A and the second object 24B.

The system 10 described herein may be used as part of an automated driving system that controls various aspects of the vehicle such as vehicle speed and/or automated braking. If a radar system installed in a host vehicle was unable to detect a nearby object such as a motorcycle directly forward of the host vehicle by discriminating the motorcycle from a larger, further away object detected by NCI, a semi-trailer in a travel lane adjacent the lane of the host vehicle, the speed control system may undesirably accelerate the host vehicle toward the motorcycle. That is, the larger signal reflected from the trailer may mask the smaller signal reflected from the motorcycle if they are near to each other in range and/or have similar range rates. In such cases, the NCI detects only one peak within a broad spectrum. Since the two objects are in adjacent lanes, the system 10 may determine only one angle tending to be for the larger signal and not be able to discriminate the angle of one object from the angle of the other, especially at longer ranges due to limited angular resolution of the angle finding technique used. This is an example of why near target discrimination on the range profiles and/or Doppler profiles or range-Doppler images is advantageous to reliably track objects the host vehicle lane.

Referring again to FIG. 1, a non-limiting example of the system 10 includes a plurality of antennas 16 configured to detect a reflected radar signal 20 reflected by an object (24A, 24B) in a field-of-view 22 of the system 10, wherein each antenna (e.g. the first antenna 16A and the second antenna 16B) of the plurality of antennas 16 is configured to output a detected signal (e.g. the first signal 30A and the second signal 30B) indicative of the reflected radar signal 20 detected by each of the antenna 16A, 16B, . . . . The controller 26 is generally configured to receive the detected signals 30 from the plurality of antennas 16, determine if a target 24 is present in the field-of-view 22 based on the detected signals 30, and determine if the target 24 includes more than one object (e.g. the first object 24A and the second object 24B) based on an analysis of phases of the detected signals 30.

The controller 26 may include a receiver 29 configured to receive an antenna signal (e.g. the first signal 30A and the second signal 30B) from each antenna (e.g. the first antenna 16A and the second antenna 16B) corresponding to the reflected radar signal 20 that was detected by each of the plurality of antennas 16. The controller 26 may include a mixer (not shown) and a local oscillator (not shown) in order to demodulate the detected signals 30. The mixer and the local oscillator may be part of the receiver 29.

Radar signals reflected by two nearby scattering centers of a target or targets formed of multiple objects interfere with each other to some degree at the antennas 16. The degree of interference depends on a relative phase difference between the various reflected radar signals from each object. This relative phase difference is a function of the lateral and longitudinal range separation between the two scattering centers, and cannot be equal across all of the antennas 16. As such, the phase spectrums of the interfered signals have different profiles across the receive antenna-array elements (the antennas 16). Amplitude spectrums of different antenna-array elements can show peaks and nulls at different frequencies (i.e. ranges) depending on the relative position difference-to-wavelength ratio. Since some automotive radar systems operate at micrometer and millimeter wavelengths, 12.5 mm and 3.92 mm for example, the relationship of "relative position difference-to-wavelength ratio" makes the spectrum profile diversity across antenna-array elements relatively dynamic and sensitive to discriminate on-road near scattering centers of an object or objects. This sensitivity also depends on number of antenna-array elements, which creates opportunities to get multiple instantaneous peaks at multiple frequency bins, and thereby increases the probability of detection and discrimination of near scattering centers using single receive channel detection technique when compared to the NCI amplitude spectrum peak detection techniques. NCI could be used to average out spectrum diversity effects of the variance of relative phase difference across receive antenna-array elements, and thereby degrade the detection and/or discrimination of a second nearby scattering center.

In cases where scattering centers position constellations result in uniform constructive interference across all receive antenna-array elements, the opportunity of receiving multiple instantaneous peaks at multiple frequency bins diminishes as the local amplitude spectrums of all receive antenna-array elements uniformly broadens and makes peaks at one and the same frequency bin only. This limits the performance improvement of near scattering centers detection and discrimination using amplitude spectrum peak evaluation technique even with the "or-logic" single channel detection technique. Specially, the degree of the performance limitation is significant for radars with small number of antenna-array elements as compared to radars with a greater numbers of antenna-array elements. Such a performance limitation is also often the case for near scattering centers with significant RCS difference. For example, a pedestrian near to an automobile, or motorcycle near to a tractor-trailer could experience up to 30 dBsm RCS difference. The spectrum of the larger target can mask the spectrum of the smaller target for all receive antenna-array elements, and makes amplitude spectrum peaks detection technique ineffective.

Typically, complete extraction of information from signals reflected by scattering centers requires a complex spectrum evaluation technique. Since the relative position difference between scattering centers is embedded in the superposed signal phase term, phase spectrum evaluation technique should still provide information about presence of near scattering centers, and overcome performance limitations by the amplitude spectrum peak detection technique for scenarios discussed herein.

In addition, a typical automotive radar sensor has limited capability to classify or categorize on road targets to distinguish, for example, a pedestrian from a vehicle by tracking the micro Doppler effect of pedestrian's motion. The pedestrian's micro Doppler detection depends on amplitude spectrum peak detection technique on the Doppler frequency domain. As in the above sections discussed, the performance limitation of amplitude spectrum peak detection technique due to signal interferences of multiple scattering centers degrades also the micro Doppler effect detection and then the tracker's limited capability to classifying pedestrian from objects like a vehicle.

The local phase spectrum evaluation technique proposed herein reinforces the radar tracking capability of classifying or categorizing targets by evaluating fluctuation of the phase difference with time. Depending on radar object geometry and motion profile, the phase difference fluctuates in time domain as far as scattering centers are in continuous motion and trigger relative position variance with time. Therefore, the time domain variance of the standard deviation of the phase difference provides further information that can be employed to classify from radar detected on-road objects in to various categories.

Figure 2:
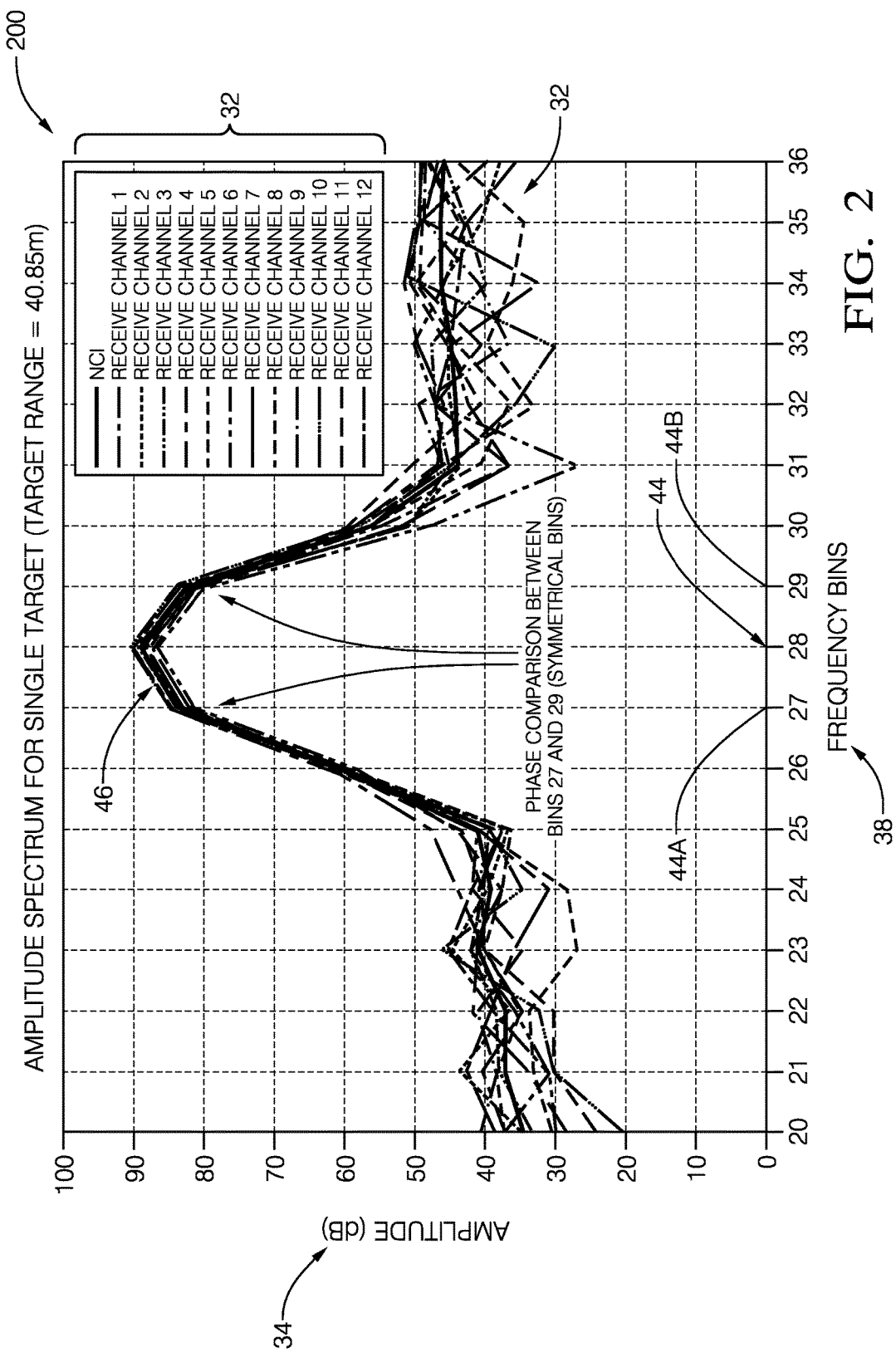
FIG. 2 is a graph of signal present in the system of FIG. 1 in accordance with one embodiment.
Figure 3:
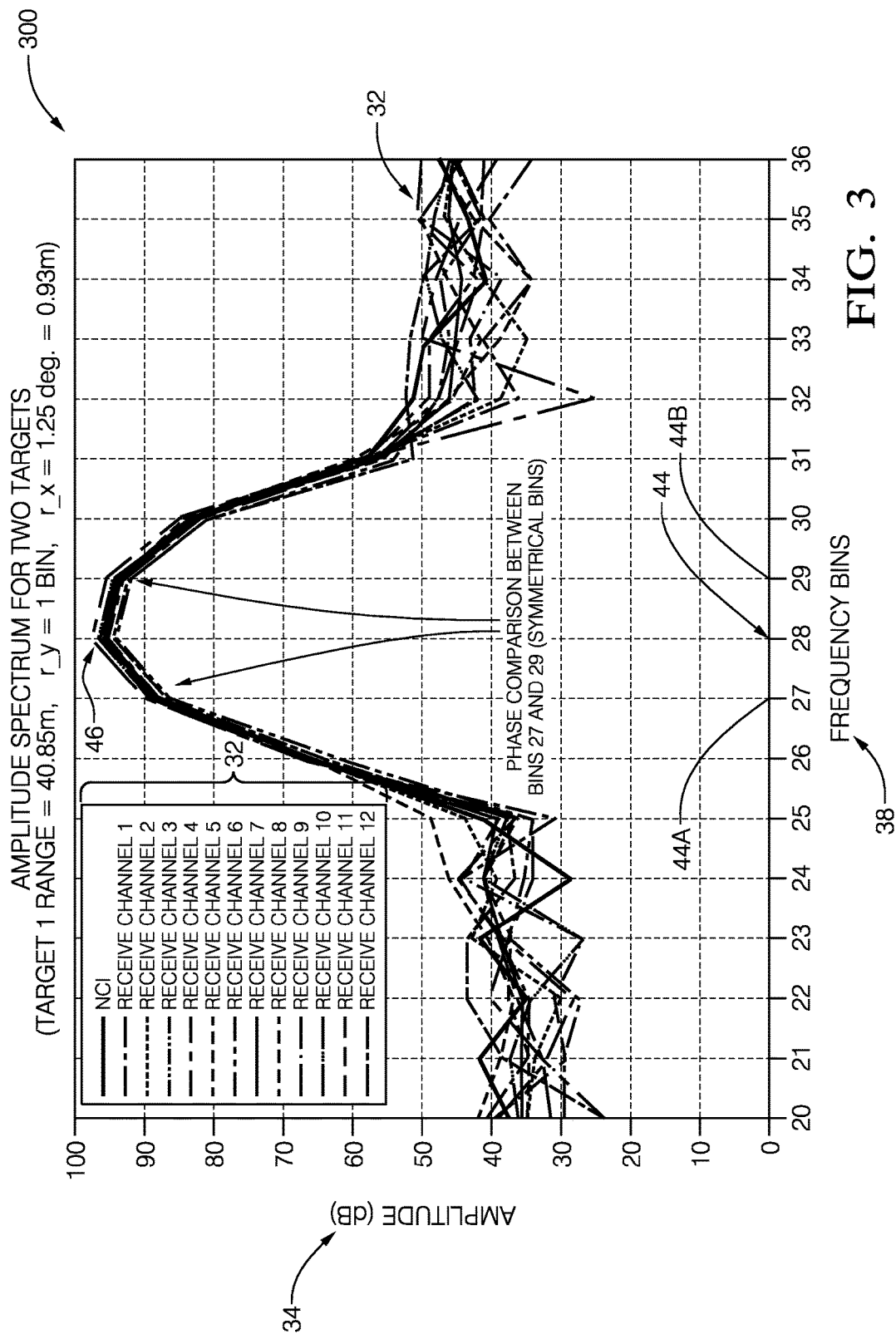
FIG. 3 is a graph of signal present in the system of FIG. 1 in accordance with one embodiment.

FIGS. 2 and 3 are non-limiting examples of a graph 200 and a graph 300 that illustrate examples of data stored in the controller 26 of the system 10. The data in FIG. 2 corresponds to a reflected radar signal from a single object with a radar cross section (RCS) comparable to a single passenger vehicle. In contrast, the data in FIG. 3 corresponds to a reflected radar signal from a two close together objects with a radar cross section (RCS) comparable to two passenger vehicles or two scattering centers from the rear and the front of a single passenger vehicle.

The detected signals 30 are typically time-domain signals that the controller 26 samples and performs a frequency transformation (e.g. a Fourier transform) to generate a frequency profile 32 of each of the detected signals, e.g. the first signal 30A and the second signal 30B. FIGS. 2 and 3 illustrate the amplitude portion 34 of the frequency profiles 32 arising from the frequency transformation. Those in the art will recognize that a frequency transformation of radar reflections arising from certain types of emitted radar signals will indicate range to a target. Those in the art will also recognize that frequency transformations may also generate phase information, see FIGS. 4 and 5, which are discussed in more detail below. In both cases (FIGS. 2 and 3), the amplitude portion 34 does not appear to be particularly useful to determine if the target 24, which is located at about forty-one meters (41 m) of range and which corresponds to frequency bin #28, is a single point reflection (e.g. only the first object 24A), or multi-point reflection (e.g. the first object 24A and the second object 24B).

Figure 4:
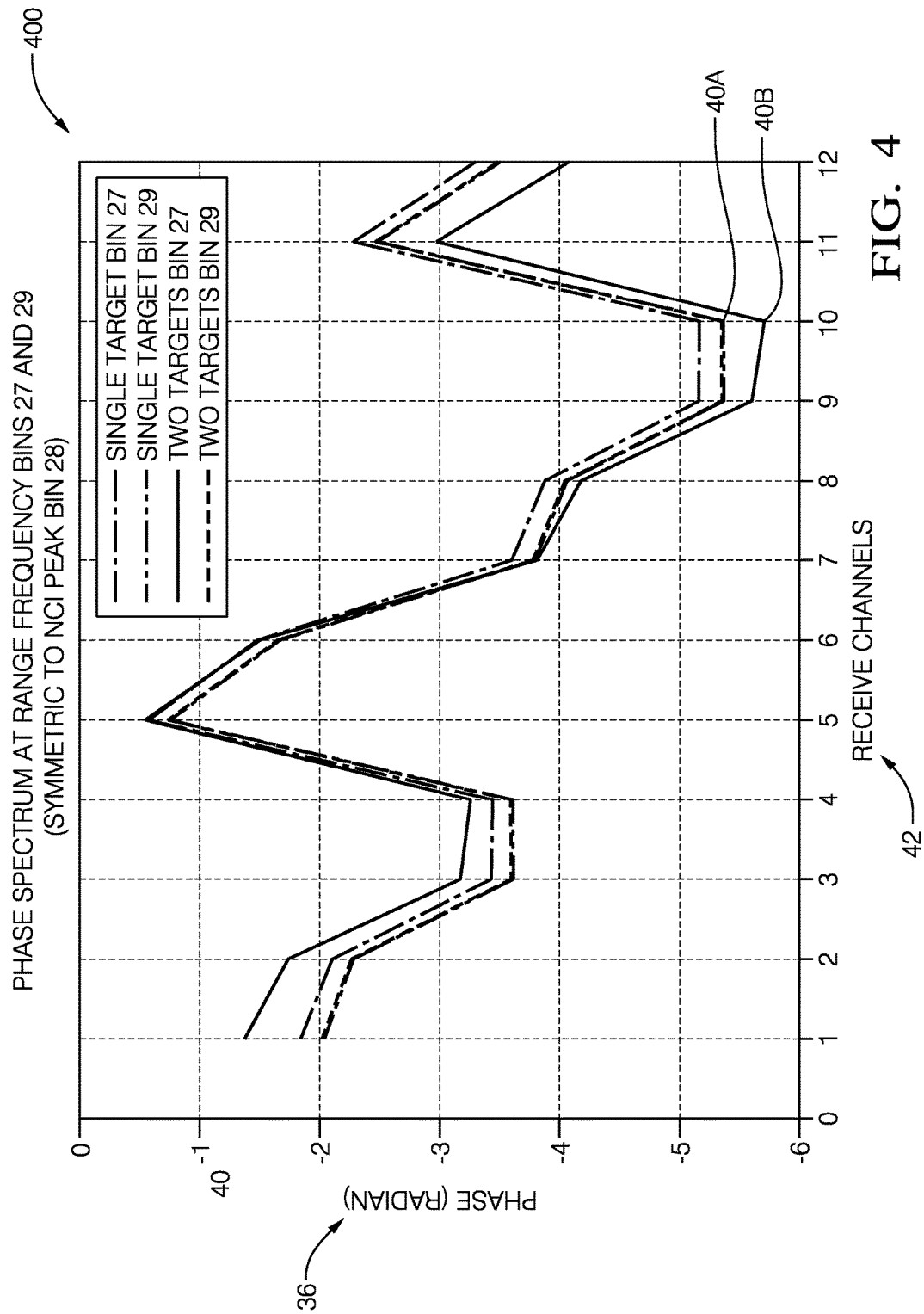
FIG. 4 is a graph of data present in the system of FIG. 1 in accordance with one embodiment.
Figure 5:
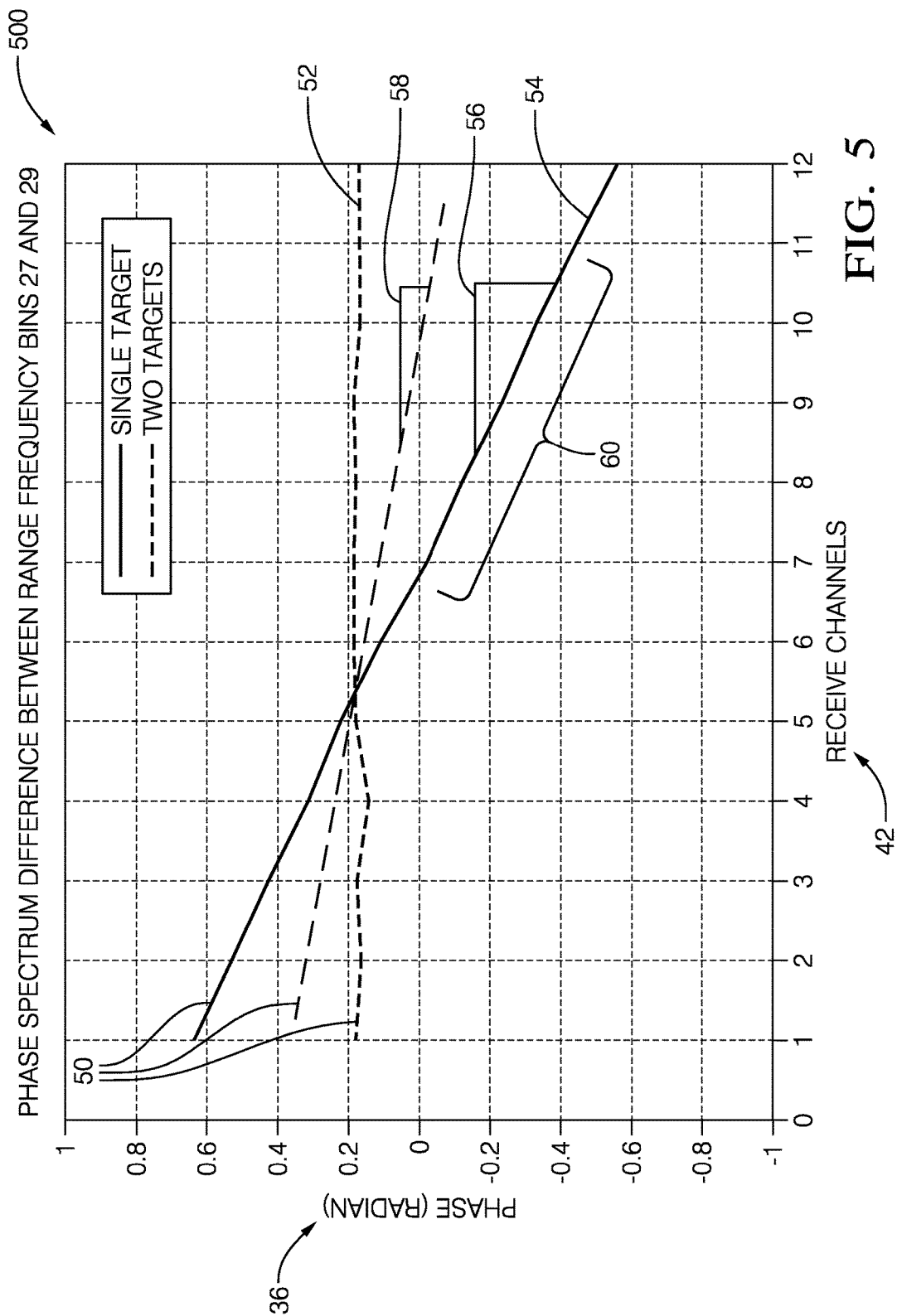
FIG. 5 is a graph of data present in the system of FIG. 1 in accordance with one embodiment.

Accordingly, the controller is advantageously configured to determine the frequency profiles 32 of each of the detected signals 30. As discussed above, the frequency profile for each of the detected signals 30 includes both an amplitude portion 34 as illustrated in FIGS. 2 and 3, and includes a phase portion 36 (FIGS. 4 and 5). Each of the frequency profiles 32 includes a plurality of amplitude values and phase values associated with frequency bins 38 that correspond to an amplitude sample and phase sample of a particular frequency profile at a particular frequency. As will be recognized by those in the art, the frequency bins 38 correspond to a range to a potential target, and the amplitude of the frequency profiles 32 is an indication of the amount of radar signal reflected at a particular range. As such, if the amplitude portion 34 of the frequency profile is relatively high, greater than 60 dB for example, it is an indication that a target is present at or near a range or distance that corresponds to the frequency bin with the greatest value of the amplitude portion 34. In FIGS. 2 and 3 the greatest value of the amplitude portion is at frequency bin #28 which corresponds to about forty-one meters (41 m).

In one embodiment, the frequency profiles 32 may be characterized as a range profile based on a frequency transformation (e.g. Fourier transform) of time-domain samples of the detected signals from all of the antennas. Alternatively, the frequency profiles 32 may be characterized as a Doppler profile based on a frequency transformation of a time-domain samples of the detected signals from all antennas. Which alternative is used is dependent on the modulation used for the radar signal 18, for example frequency modulated continuous wave (FMCW), continuous wave (CW), or Pulse-Doppler. All of these modulations schemes provide a time domain signal that can be time sampled and transformed into the frequency domain. What differs is what the frequency profile represents.

For example, a system that uses FMCW waveform with adequate number of antenna array elements may perform a 3D-Fourier transformation in various orders. The first time sample data transformation to frequency domain is to get range profile per chirp-pulse. For a given range frequency bin, it performs the second Fourier-transformation across multiple chirp-pulses in order to get the Doppler-profile. For a given range-Doppler frequency bin, it performs the third Fourier-transformation across antenna array elements to get an angle-profile (known as Digital-Beam-forming). It is noted that this kind of 3D-frequency transformation order to determine range, Doppler, and angle profiles is an example that can be also performed in different orders depending on the complexity for the intended applications.

Alternatively, a system that uses FMCW waveform with only two or three antenna array elements may be processed using a 1D-Fourier transformation only to transfer the time sample data to frequency domain using a Fourier-transformation, and then build a so called Doppler-range plane and applying a matching technique between chirps per antenna element. When an intersection between chirp frequencies domain signals is found, target detections are determined with a Doppler-range index at the intersection coordinate. After this is done for all antenna elements, a Monopulse technique (i.e. amplitude and phase comparison technique between antenna elements) is applied in order to get the angle of the detected target. For this technique, another frequency transformation stage is unnecessary.

Another alternative is to use a Pulse-Doppler waveform, which doesn't require performing Fourier-transformation on time sampled data to get range profile. Instead, so called range gates are defined as a function of sampling sequences, which immediately starts after a single pulse is completely transmitted. For example, range gate 1=ts1/(2C), range gate 2=ts2/(2C), . . . range gate N=tsN/(2C), where ts1, ts2, tsN are $1^{st}$, $2^{nd}$, . . . $N^{th}$ sampling time after a single pulse is transmitted. This is performed repeatedly for a number of successive pulses. For a given range gate, it performs a Fourier-transformation on time sample data across number of pulses to determine the Doppler profile. Since this is done for each of antenna array elements, depending on the implemented antenna technique, it can apply different angle finding techniques (including Monopulse, digital beam forming, . . . ) to get the angle of the detected target in the specific range bin and Doppler bin. That is, a Fourier transformation is performed to get a Doppler frequency profile as well as angle profile if the implemented antenna technique requires performing digital beam forming.

Radar operating with CW waveform (e.g. Police radar), does detect target's with the Doppler-profile. It is performing Fourier-transformation on time sample data to get the Doppler-profile. There is no range profile. So, as can be seen in the description above, all radars, regardless their waveform, transform the time sample data to frequency domain, and determine target's frequency profile regardless what it represents (range or Doppler or angle profile).

FIG. 4 illustrates a graph 400 of phase values 40 associated with selected range bins (#27 and #29) for each of the detected signals 30 from each of the antennas 16 labeled in this illustration as the receive channels 42. For example, the first signal 30A from the first antenna 16A is processed to determine an amplitude value and a phase value for each of the sampled frequencies associated with the frequency bins 38 a.k.a. range bins. Then one of the range bins is designated as a reference range bin 44 (#28 in this example) because it is associated with a maximum amplitude value 46. The maximum amplitude value 46 may be selected based on the maximum value of a combination of all the detected signals 30 by, for example, a non-coherent integration (NCI) of the frequency profile's 32.

FIG. 5 illustrates a graph 500 of phase differences 50 of each frequency profile at two distinct frequencies, phase bins #27 and #29 in this example. That is, each of the phase differences 50 is the difference in phase values 40 in two of the frequency bins 38 for one of the frequency profiles 32. The single object plot 52 derived from the graph 200 (FIG. 2) shows that there is little change in the phase differences 50 across the receive channels 42, while the two object plot 54 derived from the graph 300 (FIG. 3) show that there is a perceivable change in the phase differences 50 across the receive channels 42.

In summary, the frequency profiles 32 are characterized by values (the amplitude portion 34 and the phase portion 36) stored in an array of frequency bins 38. The phase differences 50 is determined based on a difference between a first phase value 40A associated with a first frequency bin 44A (#27) of the array, and a second phase value 40B associated with a second frequency bin 44B (#29) of the array. The reference frequency bin 44, which is used to select the first frequency bin 44A and the second frequency bin 44B, is associated with a maximum amplitude value 46. By way of example and not limitation, the first frequency bin 44A is adjacent to the reference frequency bin 44 and associated with a lower frequency than the reference frequency bin 44, and the second frequency bin 44B is adjacent to the reference frequency bin 44 and associated with a higher frequency than the reference frequency bin 44.

In general, the reference frequency bin 44 should have sufficient signal strength so noise is not a substantial problem to determine the phase difference between any of the of the frequency bins 44A, 44 and 44B.

Referring again to FIG. 5, it is evident that the two object plot 54 is sloped, while the single object plot 52 is relatively flat, i.e. is not sloped. Accordingly, the controller 26 may be configured to determine a phase slope 56 based on a trend or trend line in the phase differences 50 versus a relative position of each of the antennas 16 that determines the two object plot 54. The phase slope 56 may be determine using any number of method known to those in the mathematical arts, a least squares fit to the well-known equation y=mx+b for example, where m is the slope. The controller 26 may also be configured to indicate that the target 24 includes more than one object, e.g. the first object 24A and the second object 24B, if the phase slope 56 has a magnitude greater than a slope threshold 58. It is recognized that the phase slope 56 illustrated would generally be characterized as a negative slope, but positive slopes are possible for other example targets. That is why the magnitude or steepness of the phase slope is coppered to the slope threshold which is also considered in terms of absolute value and not a signed value. The value selected for the slope threshold 58 may be empirically determined through laboratory and/or field testing.

Alternatively, and likely less computationally intensive, the controller 26 may be configured to indicate that the target 24 includes more than one object if the phase difference variation 60 is greater than a variation threshold (not shown but understood to be a predetermined value). The phase difference variation 60 may be determined by, for example, calculating a standard deviation of the phase differences 50 of the two object plot 54. If the standard deviation is greater than the predetermine value of the variation threshold, then that is an indication that the target 24 includes more than one object. The value selected for the variation threshold may be empirically determined through laboratory and/or field testing.

Figure 6:
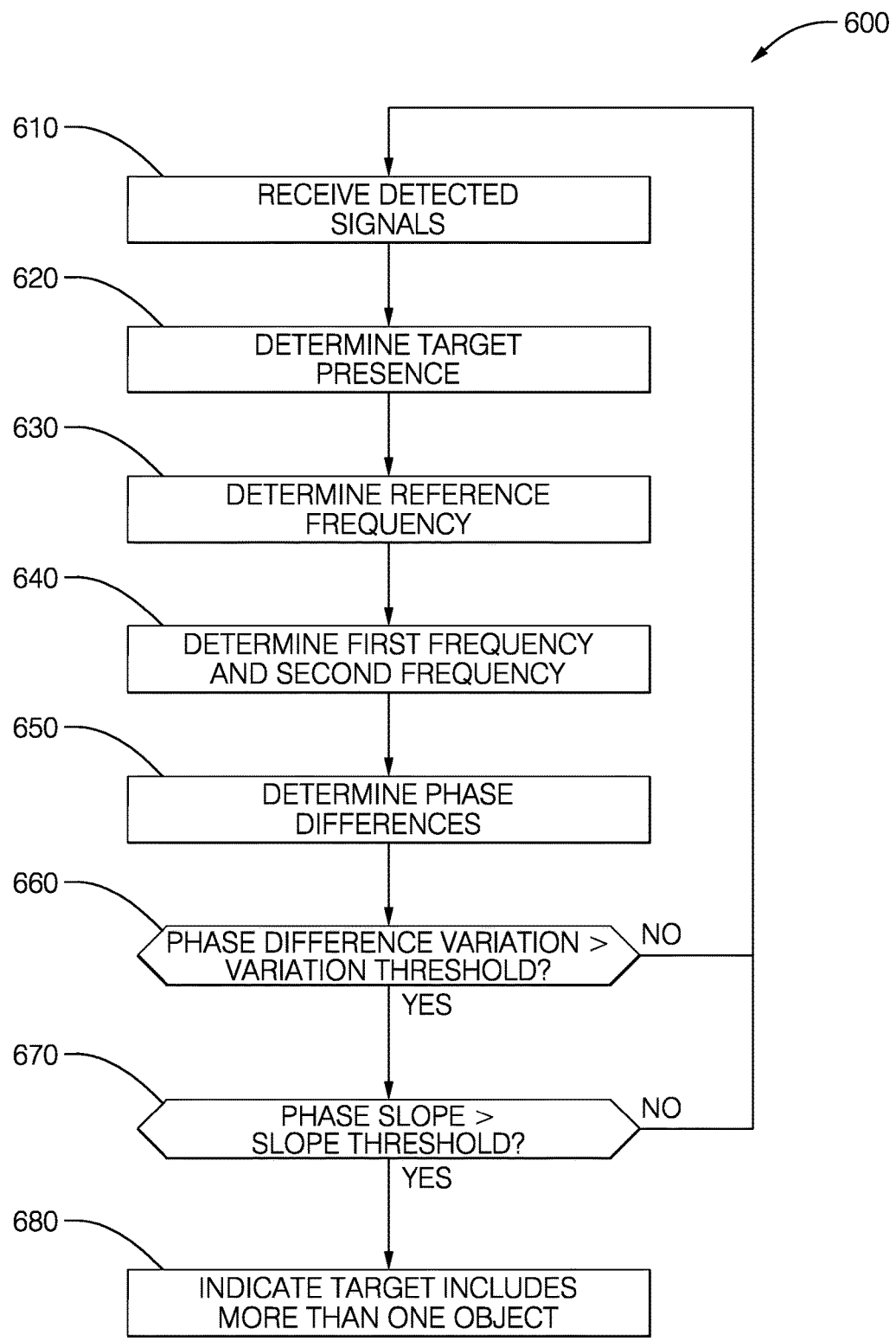
FIG. 6 is a flowchart of a method executed by the system of FIG. 1 in accordance with one embodiment.

FIG. 6 illustrates a non-limiting example of a method 600 of operating a radar system (the system 10). In particular, the method 600 is directed to determining if a target 24 detected by the system 10 includes or is made up of more than a single object based on an analysis of phases (e.g. the phase values 40) of the detected signals 30.

Step 610, RECEIVE DETECTED SIGNALS, may include a controller 26 receiving the detected signals 30 from a plurality of antennas 16 that are configured to detect a reflected radar signal 20 reflected by an object (24A, 24B) in a field-of-view 22 of the antennas 16. Each antenna (16A, 16B) of the plurality of antennas is configured to output a detected signal (30A, 30B) indicative of the reflected radar signal detected by each of the antennas 16.

Step 620, DETERMINE TARGET PRESENCE, may include determining if a target 24 is present in the field-of-view 22 based on the detected signals 30. The target 24 may be detected by determining the frequency profiles 32 of each detected signals 30 by applying frequency transformation (e.g. Fourier transform) to the time-domain signals from the antennas 16. Frequency transformations typically provide sampled values of the frequency spectrum arising from the frequency transformation and include an amplitude portion 34 and a phase portion 36.

Step 630, DETERMINE REFERENCE FREQUENCY, may include detecting a maximum amplitude value 46 of the amplitude portion 34 of the frequency profiles 32. The maximum amplitude value 46 may be a maximum or peak value from some composite of the frequency profiles 32 such as a non-coherent integration (NCI) of the frequency profiles 32. Each frequency profile may be characterized as a range profile or a Doppler profile based on a frequency transformation of a time-domain sample of the detected signal from one antenna, as previously described. The frequency profiles 32 may be sampled to generate values for frequency bins 38 that represent storage locations for the values. A reference frequency bin 44 is associated with a maximum amplitude value.

Step 640, DETERMINE FIRST FREQUENCY AND SECOND FREQUENCY, may include determining which of the frequency bins contains an amplitude value greater that some predetermine threshold. In order to calculate phase differences 50 a first frequency bin 44A and a second frequency bin 44B may be designated. The first frequency bin 44A may be adjacent to the reference frequency bin 44 and associated with a lower frequency than the reference frequency bin 44, and the second frequency bin 44B may be adjacent to the reference frequency bin 44 and associated with a higher frequency than the reference frequency bin 44. Alternatively, if the signal strength of either of the bins adjacent to the reference frequency bin 44 is too low or weak, the reference frequency bin 44 may be designated either the first frequency bin 44A or the second frequency bin 44B.

Step 650, DETERMINE PHASE DIFFERENCES, may include determining a phase differences 50 of each of the frequency profiles 32 at two distinct frequencies, e.g. frequencies associated with the first frequency bin 44A and the second frequency bin 44B. Each frequency profile is characterized by values stored in an array of frequency bins 38, and in this non-limiting example the phase difference is determined based on a difference between a first phase value 40A associated with the first frequency bin 44A of the array of receive channels 42, and a second phase value 40B associated with a second frequency bin 44B of the array of receive channels 42.

Steps 660 and 670 may both be performed, bit it is more likely that only one or the other may be performed. The showing of both steps 660 and 670 in method 600 should not be construed to mean that it is required that both steps are performed. If either or both of the tests performed by steps 660 and 670 result in the affirmative (YES), the method 600 proceeds to step 680.

Step 660, PHASE DIFFERENCE VARIATION>VARIATION THRESHOLD?, may include determining a phase difference variation 60 based on changes in the phase differences 50 versus a relative position of each antenna, which corresponds to the numbering of the receive channels 42, and determining if the phase difference variation 60 is greater than a variation threshold.

Step 670, PHASE SLOPE>SLOPE THRESHOLD?, may include determining a phase slope 56 based on a trend in the phase differences 50 versus a relative position of each antenna, and determining if the phase slope has a magnitude greater than a slope threshold.

Step 680, INDICATE TARGET INCLUDES MORE THAN ONE OBJECT, may include the controller 26 indicating that the target 24 includes more than one object if the phase difference variation 60 is greater than a variation threshold, and/or indicating that the target 24 includes more than one object if the phase slope 56 has a magnitude greater than a slope threshold 58. The indication that the target 24 includes more than one object may, for example, result in the controller initiating other software routines to further examine signals from the antennas for the purpose of classifying or categorizing the multiple objects that constitute the target 24, or illuminating an indicator to notify an operator of the vehicle that a pedestrian proximate to the vehicle has been detected.

Accordingly, a radar system (the system 10), a controller 26 for the system 10 and a method 600 of operating the system 10 is provided. These all include an improved way to determine if more than one target is present in the field-of-view 22 where prior attempts may have detected only one target. The standard deviation of the phase difference across antenna array elements indicates a single scattering center or multiple near scattering centers. If multiple near scattering centers are indicated, other near targets detection and discrimination techniques such as the single channel peak detection technique and the space time processing technique can be activated. The indication can also be used to guide the system 10 to define a Range-Doppler Near Objects Detection zone (RDNOD-zone) of the near scattering centers around the NCI-detection RD-coordinate if there is signal processing resource constraint or if the radar has a relatively small number of antenna-array elements (the antennas 16).

The time-domain fluctuation of standard deviation of the phase difference can also be used to classify radar on-road object categories. This object classifier can be used by a tracker module to make object guided parameter prediction and enhance object tracking performance. This is particularly relevant for reliably tracking laterally moving objects such as a pedestrian and a bicyclist as the radar sensor is incapable of direct lateral rate measurement. In general, the benefits of the system described herein contributes to, but is not limited to: Enhanced Near Targets identification and Discrimination; Automotive radar Target extent measurement (or imaging); Cross traffic detection and reliable tracking as result of targets discrimination and classification; and optimal usage of limited signal processing resources while improving the performance of near targets identification, discrimination, and tracking. This technique described herein is applicable in many configurations of automotive radar sensor products, and implementation is straight forward with modest increase in signal processing throughput and memory.

While this invention has been described in terms of the preferred embodiments thereof, it is not intended to be so limited, but rather only to the extent set forth in the claims that follow.

I claim:

1. A radar system comprising:
a plurality of antennas configured to detect a reflected radar signal reflected by an object in a field-of-view of the system, wherein each antenna of the plurality of antennas is configured to output a detected signal indicative of the reflected radar signal detected by each of the antenna; and
a controller configured to
receive the detected signals from the plurality of antennas,
determine if a target is present in the field-of-view based on the detected signals,
determine a frequency profile of each of the detected signals from each of the antenna, wherein the frequency profile is characterized by values stored in an array of frequency bins, and
determine a phase difference of each frequency profile at two distinct frequencies of an antenna, wherein the phase difference is determined based on a difference between a first phase value associated with a first frequency bin of the array, and a second phase value associated with a second frequency bin of the array, and
determine if the target includes more than one object based on an analysis of phase differences of the frequency profile of each the detected signals.

2. The system in accordance with claim 1, wherein the frequency profile is characterized as a range profile based on a frequency transformation of a time-domain sample of the detected signal from one antenna.

3. The system in accordance with claim 1, wherein the frequency profile is characterized as a Doppler profile based on a frequency transformation of a time-domain sample of the detected signal from one antenna.

4. The system in accordance with claim 1, wherein a reference frequency bin is associated with a maximum amplitude value, the first frequency bin is adjacent to the reference frequency bin and associated with a lower frequency than the reference frequency bin, and the second frequency bin is adjacent to the reference frequency bin and associated with a higher frequency than the reference frequency bin.

5. The system in accordance with claim 1, wherein the controller is further configured to
determine a phase slope based on a trend in the phase difference versus a relative position of each antenna, and
indicate that the target includes more than one object if the phase slope has a magnitude greater than a slope threshold.

6. The system in accordance with claim 1, wherein the controller is further configured to
determine a phase variation based on changes in the phase difference versus a relative position of each antenna, and
indicate that the target includes more than one object if the phase variation is greater than a variation threshold.

7. A controller for a radar system, said controller comprising:
a receiver configured to receive detected signals from a plurality of antennas configured to detect a reflected radar signal reflected by an object in a field-of-view of the system, wherein each antenna of the plurality of antennas is configured to output a detected signal indicative of the reflected radar signal detected by each of the antenna; and
a processor configured to
receive the detected signals from the plurality of antennas,
determine if a target is present in the field-of-view based on the detected signals, determine a frequency profile of each of the detected signals from each of the antenna, wherein the frequency profile is characterized by values stored in an array of frequency bins, and determine a phase difference of each frequency profile at two distinct frequencies of an antenna, wherein the phase difference is determined based on a difference between a first phase value associated with a first frequency bin of the array, and a second phase value associated with a second frequency bin of the array, and determine if the target includes more than one object based on an analysis of phase differences of the frequency profile of each the detected signals.

8. A method of operating a radar system comprising:

receiving detected signals from a plurality of antennas configured to detect a reflected radar signal reflected by an object in a field-of-view of the antennas, wherein each antenna of the plurality of antennas is configured to output a detected signal indicative of the reflected radar signal detected by each of the antenna; and determining if a target is present in the field-of-view based on the detected signals;

determining a frequency profile of each of the detected signals from each of the antenna, wherein the frequency profile is characterized by values stored in an array of frequency bins, and determining a phase difference of each frequency profile at two distinct frequencies of an antenna, wherein the phase difference is determined based on a difference between a first phase value associated with a first frequency bin of the array, and a second phase value associated with a second frequency bin of the array, and determining if the target includes more than one object based on an analysis of phase differences of the frequency profile of each the detected signals.

9. The method in accordance with claim 8, wherein the frequency profile is characterized as a range profile based on a frequency transformation of a time-domain sample of the detected signal from one antenna.

10. The method in accordance with claim 8, wherein the frequency profile is characterized as a Doppler profile based on a frequency transformation of a time-domain sample of the detected signal from one antenna.

11. The method in accordance with claim 8, wherein a reference frequency bin is associated with a maximum amplitude value, the first frequency bin is adjacent to the reference frequency bin and associated with a lower frequency than the reference frequency bin, and the second frequency bin is adjacent to the reference frequency bin and associated with a higher frequency than the reference frequency bin.

12. The method in accordance with claim 8, wherein the method includes determining a phase slope based on a trend in the phase difference versus a relative position of each antenna, and indicating that the target includes more than one object if the phase slope has a magnitude greater than a slope threshold.

13. The method in accordance with claim 8, wherein the method includes determining a phase variation based on changes in the phase difference versus a relative position of each antenna, and indicating that the target includes more than one object if the phase variation is greater than a variation threshold.

* * * * *